United States Patent [19]

Yamauchi

[11] 4,331,888
[45] May 25, 1982

[54] TEMPERATURE DETECTING APPARATUS

[75] Inventor: Yukio Yamauchi, Kawasaki, Japan

[73] Assignee: Hochiki Corporation, Tokyo, Japan

[21] Appl. No.: 69,405

[22] Filed: Aug. 24, 1979

[30] Foreign Application Priority Data

Feb. 6, 1979 [JP] Japan ............................ 54-13424[U]
Aug. 24, 1979 [JP] Japan ................................ 54-102329

[51] Int. Cl.³ .......................... G01K 7/00; H03K 3/26; G01K 3/10
[52] U.S. Cl. ...................................... 340/598; 328/8; 340/589; 307/310; 374/169; 374/178
[58] Field of Search ............................ 328/8; 307/310; 330/256; 73/362 C; 340/588, 589

[56] References Cited

U.S. PATENT DOCUMENTS

3,809,929  5/1974  Vittoz .................................. 307/310
4,004,462  1/1977  Dobkin ................................. 323/8
4,071,813  1/1978  Dobkin ............................ 73/362 C Primary Examiner—Stanley D. Miller, Jr.
Assistant Examiner—B. P. Davis
Attorney, Agent, or Firm—Sughrue, Mion, Zinn, Macpeak & Seas

[57] ABSTRACT

A temperature detecting apparatus having a first transistor connected in diode configuration or a first diode, with its forward current set in certain value. A second transistor has similar electrical characteristics as the first transistor or the first diode, with the anode or cathode of the first transistor or the first diode being connected to the base of the second transistor. The temperature difference between the first transistor or the first diode and the second transistor is detected by means of the variation of the collector current of the second transistor. In another embodiment, a third transistor matched to second one is used with common base connections. The first transistor is coupled to the common base coupling.

20 Claims, 18 Drawing Figures

TEMPERATURE DETECTING APPARATUS

BACKGROUND OF THE INVENTION

The present invention is directed, in general, to temperature detecting apparatus that can be applicable to electronic fire detectors and the like. In particular, this invention is related to an improvement in temperature detecting apparatus functioning to sense unusual increase rates of ambient temperature.

Figure 1:
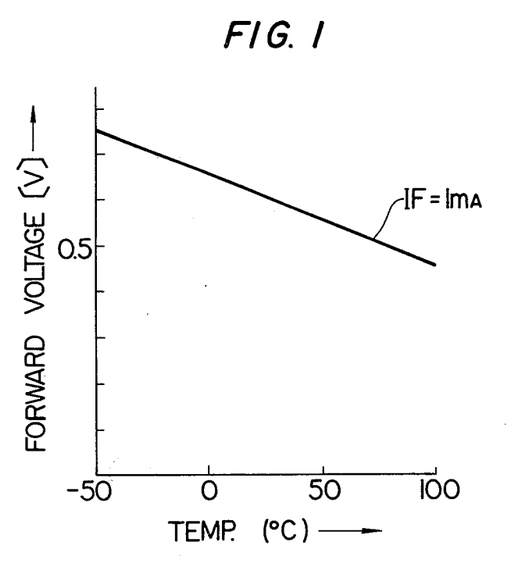
FIG. 1 is a graphical illustration of temperature-forward voltage characteristics of a semi-conductor diode.

It is well known that a forward voltage drop developed across the P-N junction of a semi-conductor diode (called "forward voltage" hereinafter) will vary linearly over a wide range of temperature change when the forward current thereof (called "forward current" hereinafter) is kept constant. Hence, a semi-conductor diode is widely used as a temperature sensing element having stable and reliable characteristics. In FIG. 1, there is shown a sample of typical temperature-forward voltage characteristics of a semi-conductor diode.

Within the prior art, a variety of temperature detecting apparatus based on such characteristics of semi-conductor diodes are known. A review of those known devices makes it easier to understand the objects, advantages and features of this invention.

Figure 2:
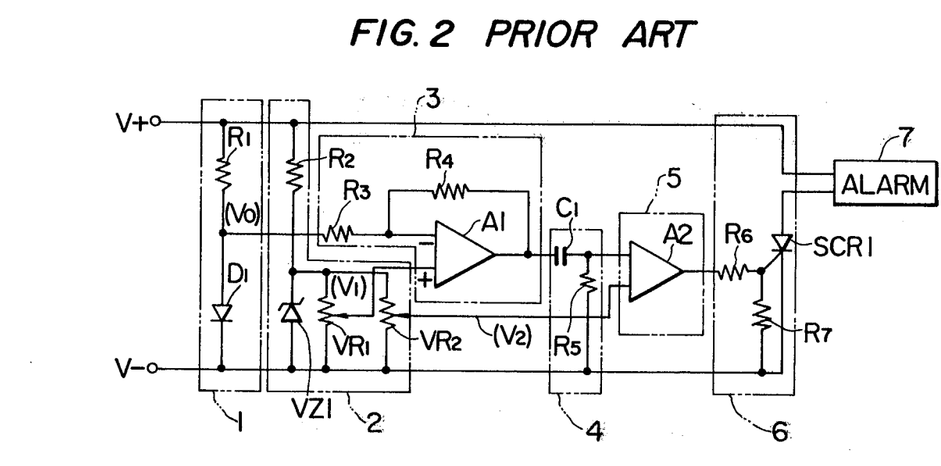
FIG. 2 is a circuit diagram of a temperature detecting apparatus according to the prior art.

Referring now to FIG. 2, there is shown a schematic circuit diagram of a temperature detecting apparatus according to prior art, in which numeral 1 denotes a sensing circuit comprising a diode $D_1$ and a resistor $R_1$ that decides a forward current of the sensing circuit. Numeral 2 indicates a reference voltage generating circuit consisting of a resistor $R_2$, variable resistors $VR_1$ and $VR_2$, and a Zener diode $VZ_1$. The reference voltage generating circuit produces two kinds of predetermined voltage $V_1$ and $V_2$, where the voltage $V_1$ has a closer value to the forward voltage $V_0$ of the diode $D_1$ of the sensing circuit 1. Numeral 3 denotes an amplifier circuit comprising an amplifier $A_1$ and two resistors $R_3$ and $R_4$, which amplify the voltage difference between the output voltage $V_0$ of the sensing circuit 1 and the output voltage $V_1$ of the reference voltage generating circuit 2. Numeral 4 indicates a differentiating circuit comprising a capacitor $C_1$ and a resistor $R_5$, which produces an output voltage in proportion to the change rate of the output of the amplifier circuit 3.

Figure 3:
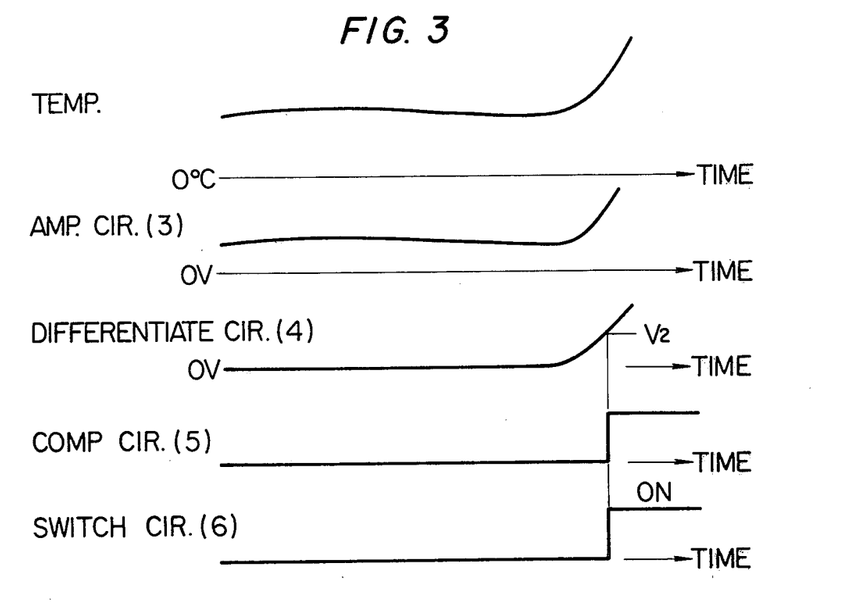
FIG. 3 is a graphical illustration of operational states of the circuit shown in FIG. 2.

Numeral 5 denotes a comparator circuit composed of an amplifier $A_2$ functioning to compare the output from the differentiating circuit 4 with one of the outputs $V_2$ of the reference voltage generating circuit 2, which will develop an output when the output of the differentiating circuit 4 becomes larger than the reference voltage $V_2$. Numeral 6 indicates a switching circuit consisting of a thyristor $SCR_1$ and two resistors $R_6$ and $R_7$, which are rendered conductive in response to the output from the comparator circuit 5 to energize a warning device 7. Graphical illustrations of operational states of each circuit as well as temperature variation with time are shown in FIG. 3.

A temperature detecting apparatus of the type described above taken in conjunction with the drawing shown in FIG. 2 usually has some problems directly connected with the inherent characteristics of a semi-conductor diode. First, the voltage change rate of the sensing diode caused by temperature variation is usually very small as compared with the forward voltage thereof. Hence, it is inevitably required to provide a precise voltage reference, not affected by temperature change, to detect errorlessly the difference between the reference voltage and the forward voltage of the sensing diode. A reference voltage less affected by temperature change can be obtained by employment of, for instance, a very expensive circuit element.

Second, since the forward voltage of a semi-conductor diode varies from one to another within certain limits, the variation must be compensated by means of adjusting the reference voltage in every apparatus. Hence, calibration of each device is necessary as a fundamental part of installation and use.

Another problem exists in the necessity of a change rate detecting circuit such as a differentiating circuit in order to detect temperature change rate, namely temperature rise rate. It is generally acknowledged that the differentiating circuit must be provided with at least several minutes of time constant in order to effectively detect fire. The realization of such a larger time constant necessitates larger values of the capacitor and resistor. Moreover, when such a larger time constant is employed for the differentiating circuit, it may take as long as the time constant of the differentiating circuit until the circuit reaches steady state operation after the power supply is turned on. This means that the apparatus will not be able to fulfill its primary function as a temperature detector, which is a crucial problem for an apparatus such as fire detector.

Also, in the prior art, temperature sensors for detecting fire or extreme heat conditions by a determination of absolute temperature are known. Typical is the circuit shown in U.S. Pat. No. 4,071,813. In that patent, the difference between base-emitter voltages of matched transistors is used to provide an output directly proportional to sensed absolute temperature. The two transistors are operated at different current densities and are maintained at the same temperature. Such a technique while generally effective still requires accurate matching of circuit elements and precise calibration. This is particularly true where the device is intended to exhibit a linear output directly related to a known temperature scale.

In contrast, the present invention does not require such precision in calibration and uses two transistors operating at the same current densities when the transistors are subjected to the same temperature. The advantages of the invention therefore lie in the use of the system for the detection of fire by sensing temperature differences.

SUMMARY OF THE INVENTION

It is, therefore, the primary object of the present invention to provide a novel and improved temperature detecting apparatus, in which a P-N junction of a transistor is utilized as a sensing diode.

It is another object of this invention to provide a temperature detecting device where the transistor forward voltage is amplified by the transistor itself thereby dispensing with additional amplifiers.

Yet another object of this invention is to provide a temperature detecting device using two transistors having different thermal time constants, which are used to dispense with employment of a reference voltage generating circuit as well as differentiating circuit. As used herein, the term "thermal time constant" refers to a measure of the speed at which the temperature of a transistor will change in response to changes in the ambient temperature.

A further object of this invention is to provide a temperature detecting device that achieves design simplicity, lower cost and greater reliability than has been provided in other types of apparatus having similar purposes.

Other objects, advantages and features of the present invention will become apparent with the following detailed description of a preferred form of the invention taken in conjunction with accompanying drawings.

DESCRIPTION OF THE PREFERRED EMBODIMENT

Figure 4:
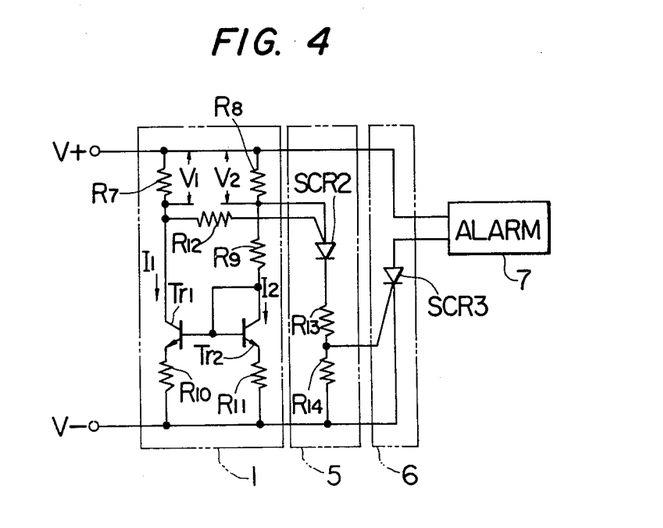
FIG. 4 is a schematic circuit diagram of an embodiment of the present invention.

Referring now to FIG. 4, a circuit diagram of a first embodiment of the invention is shown. In the drawing, reference numeral 1 denotes a sensing circuit comprising two transistors $Tr_1$ and $Tr_2$, having similar electrical characteristics and at the same time different thermal time constants, and five resistors $R_7$, $R_8$, $R_9$, $R_{10}$ and $R_{11}$. It will be hereinafter assumed that the thermal time constant, of the transistor $Tr_2$ is selected to be larger than that of the transistor $Tr_1$. The transistor $Tr_2$ is interconnected between the collector and base thereof so that the transistor $Tr_2$ comprises a diode (diode configuration). A comparator circuit 5 is provided comprising an N gate thyristor $SCR_2$ and three resistors $R_{12}$, $R_{13}$ and $R_{14}$. The comparator circuit 5 produces an output when the difference between the two outputs of the sensing circuit 1, which are the voltages developed across the resistors $R_7$ and $R_8$, respectively, exceeds a predetermined level. Reference numeral 6 denotes a switching circuit comprising a thyristor $SCR_3$, which responds to the output of the comparator circuit 5 to turn on, so that the switching circuit 6 in turn actuates a warning device 7 to provide the alarm.

FIGS. 5–9 relate to apparatus for obtaining two transistors $Tr_1$ and $Tr_2$ having nearly the same electrical characteristics but different thermal time constants.

Figure 5:
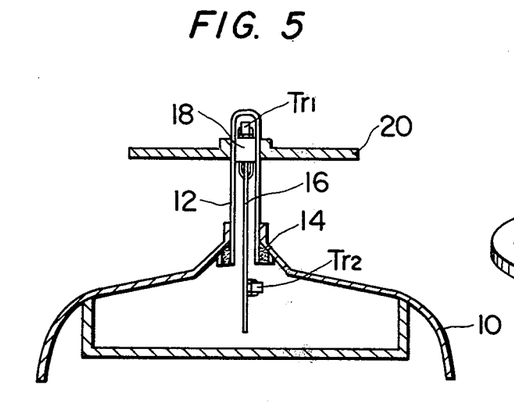
FIG. 5 is a cross-sectional view illustrating a heat detecting device, where mini-mold transistors $Tr_1$ and $Tr_2$ are provided at different positions.

FIG. 5 is a cross-sectional view illustrating a heat detecting device, where mini-mold transistors $Tr_1$ and $Tr_2$ are provided at different positions, whereby the transistor $Tr_1$ has a thermal time constant less than one minute and the transistor $Tr_2$ has a thermal time constant of a few minutes to ten minutes. The thermal time constant of the transistor $Tr_2$ is determined according to its position on a printed circuit board 16 with respect to the position of the transistor $Tr_1$. Specifically, if it is desired that the transistor $Tr_2$ has a thermal time constant of a few minutes, the transistor $Tr_2$ is provided in the vicinity of the transistor $Tr_1$. If the transistor $Tr_2$ is provided on the printed circuit board 16 as shown in FIG. 1, the transistor $Tr_2$ may have a thermal time constant of about ten minutes.

It should be noted that a heat collector 20 and a protection pipe 12 are made of materials having a high heat conductivity and a low specific gravity, such as an aluminum or an aluminum alloy. If an anti-corrosion property is required, stainless or titanium may be used. On the other hand, a casing is made of a plastic resin.

Figure 6:
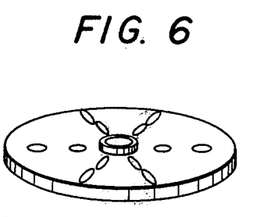
FIG. 6 is a schematic perspective view illustrating one example of the heat collector.
Figure 7:
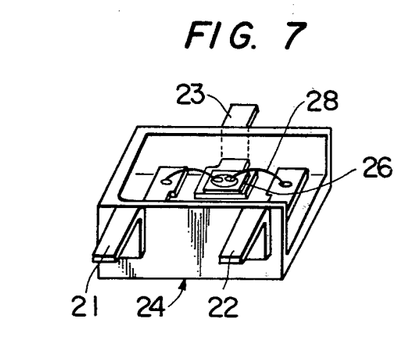
FIG. 7 is a schematic perspective view illustrating a mini-mold transistor.
Figure 8:
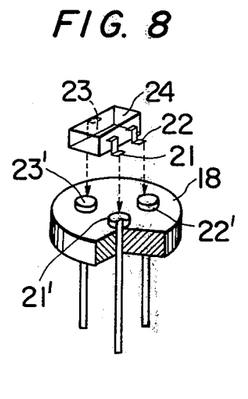
FIG. 8 is a schematic perspective view illustrating a coupling condition of the mini-mold transistor and a transistor holder.
Figure 9:
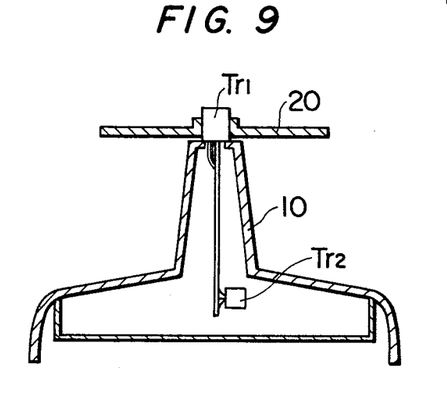
FIG. 9 is a cross-sectional view illustrating a heat detecting device where a transistor having an ordinary size is employed as a transistor $Tr_1$ instead of the above mentioned mini-mold transistor.

FIG. 6 is a schematic perspective view illustrating one example of the heat collector, and FIG. 7 is a schematic perspective view illustrating a mini-mold transistor. FIG. 8 is a schematic perspective view illustrating a coupling condition of the mini-mold transistor and a transistor holder. FIG. 9 is a cross-sectional view illustrating a heat detecting device where a transistor having an ordinary size is employed as a transistor $Tr_1$ instead of the above mentioned mini-mold transistor.

Specifically, in FIG. 5, a mini-mold transistor $Tr_2$ is housed in a casing 10, as previously indicated comprising a plastic material. The casing is coupled to a metal protection pipe 12 by means of adhesive material 14. Disposed inside the protection pipe is a printed circuit board 16 holding a transistor holder 18 and mini-mold transistor $Tr_1$. A heat collector 20 is positioned annularly about the transistor holder 18. The heat collector is shown in FIG. 6 as being generally disc shaped with a central opening to slip over the protection pipe 12.

Mini-mold transistors are generally known and one example is shown in FIG. 7 with the coupling to the transistor holder 18 shown in FIG. 8. The transistor is of course a three terminal device with leads 21, 22, 23 positioned on the outside of a casing 24 made of an insulator such as plastic resin. The transistor chip 26 is placed inside the casing and has the necessary terminal wires 28. As indicated, the transistors may be either NPN or PNP types. The mini-mold transistor $Tr_1$ is placed on a ceramic base member having terminal portions 21', 22' and 23' corresponding to the leads on the case 24. The terminal portions are formed with integral lead wires as shown coupled to the printed circuit board.

In place of the mini-mold transistor, the ordinary size transistor may be used. This is shown in FIG. 9 wherein the same elements as in FIG. 5 are shown with the same numbers. The positioning of the heat collector is different to accomodate the transistor $Tr_1$ but otherwise the detector is the same.

Now detailed consideration on the operation of the sensing circuit will be given below.

In general, when two transistor $Tr_1$ and $Tr_2$ having identical characteristics are placed under same circumstances and the collector currents thereof are expressed as $I_1$ and $I_2$ respectively, the difference between the base-to-emitter voltages $V_{BE1}$ and $V_{BE2}$, namely the forward voltage of the PN junction of each transistor can be stated by the formula:

$$V_{BE2} - V_{BE1} = \frac{kT}{q} \ln\left(\frac{I_2}{I_1}\right) \tag{1}$$

where: k is Baltzmann's constant, T is absolute temperature and q is electron charge. The formula (1) is one which can be derived from the following general equation expressing the electrical characteristics of a PN junction diode:

$$I = I_s\left(e^{\frac{qV}{kT}} - 1\right) \tag{2}$$

where: Is is reverse saturation current of the P-N junction and V is the P-N junction voltage.

In the sensing circuit 1, there is established the following relationship:

$$V_{BE1} + I_1 \cdot R_{10} = V_{BE2} + I_2 \cdot R_{11} \tag{3}$$

Hence, assuming that the transistors $Tr_1$ and $Tr_2$ are of identical characteristics and their amplification factor and the supply voltage E (V+, V−) are large enough, and the relationship $R_8 + R_9 >> R_{11}$ is satisfied, and further the current $I_2$ can be decided by the relationship $I_2 \approx E/(R_8 + R_9)$, and if the transistors $Tr_1$ and $Tr_2$ are of same temperature, then, the following relationship can be derived from the equation (1):

$$\ln\left(\frac{I_2}{I_1}\right) = \frac{q}{kT}(I_1 \cdot R_{10} - I_2 \cdot R_{11}) \tag{4}$$

In the equation (4), if the relationship $R_{10} = R_{11}$ is established, then:

$$I_1 = I_2 = E/(R_8 + R_9) \tag{5}$$

This equation (5) means that both the currents $I_1$ and $I_2$ are identical and constant regardless of temperature.

Now assuming again that the temperature of the transistor $Tr_1$ becomes higher than the transistor $Tr_2$ by a certain value $\Delta T$ (degrees), then the variation of base-to-emitter voltage $\Delta V_{BE1}$ of the transistor $Tr_1$ will be expressed by the following equation:

$$\Delta V_{BE1} = V_{BE1}(T)\Delta T + V_{BE1}(I_1)\Delta I_1 = -C\Delta T + \frac{kT}{q}\frac{\Delta I_1}{I_2} \tag{6}$$

where: T is the temperature of the transistor $Tr_2$ and the difference between the transistors $Tr_1$ and $Tr_2$ is very small and only the transistor $Tr_1$ varies its base-to-emitter voltage $V_{BE1}$. It is also assumed here that the collector currents $I_1$ and $I_2$ of the transistors $Tr_1$ and $Tr_2$ depending upon the ratings thereof are expressed as $I_2 = I_{10}$ and $I_1 = I_{10} + \Delta I_1$.

On the other hand, since the right side of the equation (3) is constant, the following equation will be established.

$$\Delta V_{BE1} + \Delta I_1 \cdot R_{10} = 0$$

Consequently, the following relationship between $\Delta T$ and $\Delta I_1$ can be derived from the two equations (6) and (7) by eliminating $V_{BE1}$ therefrom:

$$\Delta I_1 = \frac{C\Delta T}{R_{10}\left(\frac{kT}{I_2 R_{10} q} + 1\right)} = A \cdot \Delta T \tag{8}$$

Where: A is a coefficient expressing change rate of the collector current $I_1$ of the transistor $Tr_1$ for unit temperature change when a certain difference of temperature is brought about between the two transistors $Tr_1$ and $Tr_2$.

The temperature dependent characteristic of the coefficient A is based on the first term of the denominator, which becomes smaller as the temperature increases. When $I_2 (=I_{10})$ and $R_{10} (=R_{11})$ are selected properly to keep the product of $I_2$ and $R_{10}$ ($I_2 \times R_{10}$) appropriate, the temperature dependency thereof can be substantially negligibly small within the temperature range of practical use for an apparatus such as, for instance, a fire detector (0° C.–100° C. or 273 K.–373 K.). The temperature dependency can also be reduced, as described later, by selecting the value of $R_{10}$ and $I_2$ to cancel the temperature characteristic of the sensing element used in the comparator circuit 5.

In the equation (8), k and q are physical constants and they take the value of $1.38054 \times 10^{-23}$ (j·K$^{-1}$)and $1.60210 \times 10^{-19}$(c), respectively. Then, let $R_{10}$, $I_2(=I_{10})$ and ($R_{10} \times I_2$) be 5(KΩ), 15(μA) and 0.075, respectively, the value of A will approximately be 0.92 at 100° C. (373 K.) if A is assumed to be united at 0° C. (273 K.). If the value of ($R_{10} \times I_2$) is chosen to be 0.06, the value of the coefficient A 100° C.(373 K.) will be 0.9. This means that if the value of the product of $R_{10}$ and $I_2$ ($R_{10} \times I_2$) is selected to be larger than 0.06($R_{10} \times I_2$)>0.06), temperature detecting errors remain less than ten percent over the temperature range from 0° C. (273 K.) to 100° C. (373 K.). This value of ten percent error satisfactorily meets the requirements for fire detector.

The operation of the circuit shown in FIG. 4 will now be described in detail. Assuming that the resistor $R_7$ has the same value as the resistor $R_8$ and resistor $R_{10}$ equals to the resistor $R_{11}$ ($R_7 = R_8$, $R_{10} = R_{11}$) if the temperature of the transistor $Tr_1$ and that of the transistor $Tr_2$ are equal, the collector currents $I_1$ and $I_2$ thereof are identical and kept constant whatever temperature it may be as shown in the equation (5). Since the resistors $R_7$ and $R_8$ are equal, each voltage drop $V_1$ and $V_2$ developed across the resistors $R_7$ and $R_8$ respectively are identical. Consequently no output will be given from the comparator circuit 5 to the switching circuit 6, which in turn will not operate. Both the transistors $Tr_1$ and $Tr_2$ can equally follow a slow temperature change such as usual room temperature change and, as a result, there will be no temperature difference between the transistors $Tr_1$ and $Tr_2$ and the apparatus will not trigger any warning.

Figure 10:
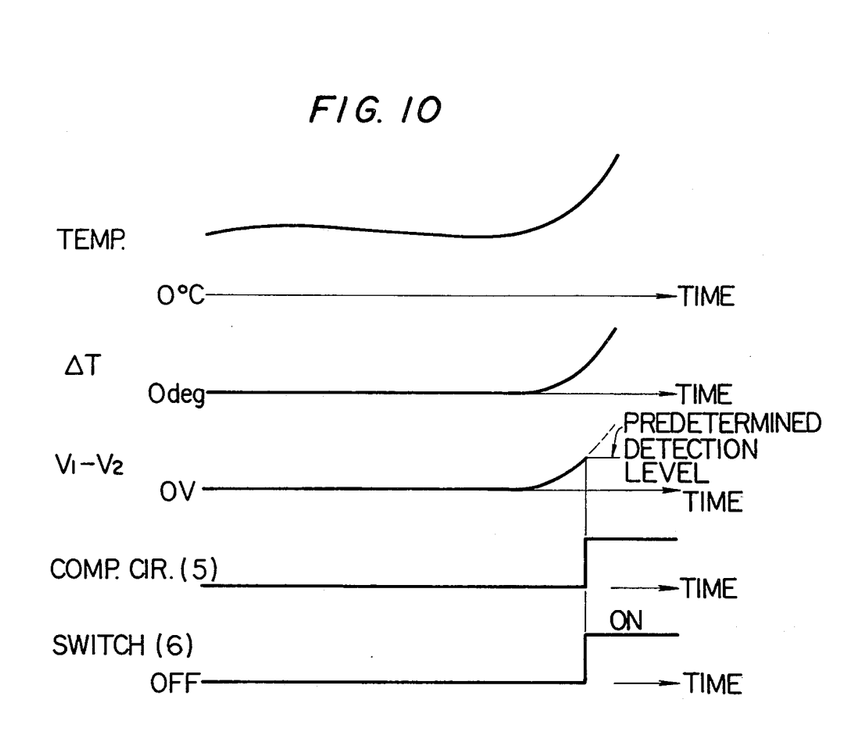
FIG. 10 is a graphical illustration of operational states of the circuit shown in FIG. 4.

On the other hand, if the ambient temperature rises rapidly due to some cause such as fire, the temperature of the transistor $Tr_1$ will be raised following the ambient change on account of the smaller thermal time constant thereof. However, the transistor $Tr_2$ cannot immediately follow the ambient temperature change because of its larger thermal constant. As used throughout the specification and in the amended claims, the term "thermal time constant" refers to a measure of the rate at which the temperature of a semiconductor device will change in response to changes in the temperature of the medium being sensed. As a consequence, there will exist a temperature difference between the two transistors $Tr_1$ and $Tr_2$, which increases the collector current $I_1$ of the transistor $Tr_1$ in accordance with the equation (8). This increase of the collector current $I_1$ develops the larger voltage drop $V_1$ across the resistor $R_7$, which leads to a voltage difference between $V_1$ and $V_2$. When the voltage difference exceeds a predetermined level, the comparator circuit 5 produces an output to trigger the switching circuit 6 which in turn actuates the warning device 7. Graphical illustrations of operational state of each circuit as well as temperature change with time are shown in FIG. 10 for better understanding of the operation of the apparatus.

Figure 11:
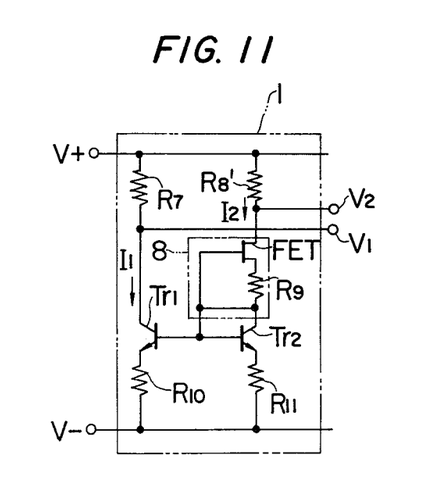
FIG. 11 is a schematic circuit diagram of another embodiment of the present invention.

In FIG. 11, there is shown a second embodiment of a sensing circuit applicable to the temperature detecting apparatus of this invention. In comparison with the sensing circuit described above, the feature of this sensing circuit resides in the provision of a constant current circuit 8 comprising a field effect transistor FET and a resistor $R_9$, which are connected in series with the transistor $Tr_2$ to regulate the variation of the current $I_2$ ($=I_{10}$) due to the fluctuation of the supply voltage and thereby stabilize the operation of the sensing circuit.

In the foregoing description, although the sensing transistors are illustrated as NPN type in those two embodiments, it is recognized that PNP type transistors can also be utilized in a very similar manner.

From the foregoing description, it is quite clear that the temperature detecting apparatus according to the invention has many advantages to achieve design simplicity, higher durability, and greater reliability than has been provided in other types of apparatus having similar purposes.

However, although the temperature detecting apparatus stated above is of great advantage in principle, it is subject to malfunction in practice due to voltage fluctuations of the power supply or variation in the characteristics of transistors used. Hence, it finds greatest utilization in environments of stable power supplies.

Referring again to FIG. 11, the current $I_2$ can be regulated by the constant current circuit 8 within precise limits regardless of changes in supply voltage (V+, V−), but the current $I_1$ will be affected by the voltage variation of the power supply. This variation of the current $I_1$ may cause malfunction in operation of the apparatus because the temperature detecting apparatus senses the change of ambient temperature by way of the difference between the collector currents $I_1$ and $I_2$ of the respective transistors $Tr_1$ and $Tr_2$.

Figures 12A, 12B, 13:
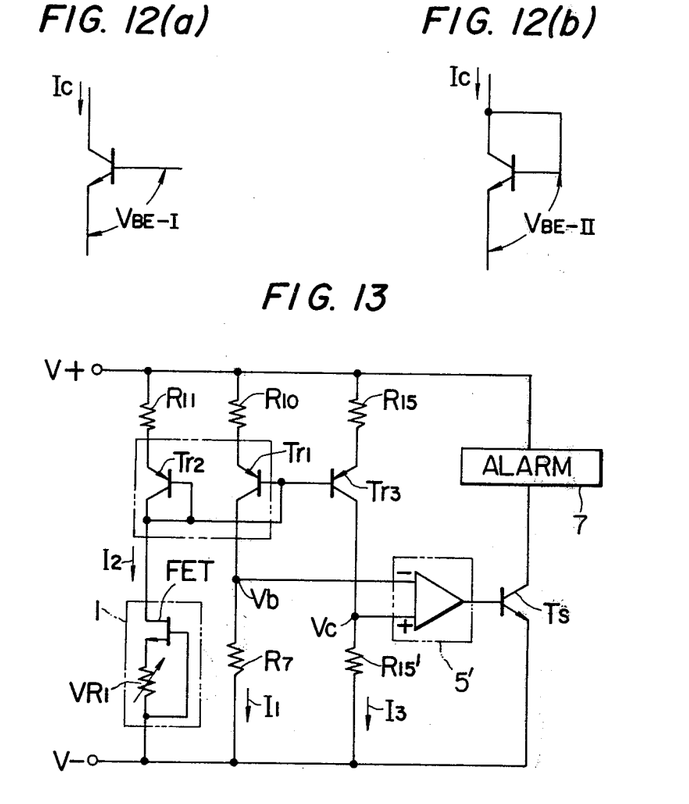
FIGS. 12(a) and 12(b) are explanatory diagrams showing $V_{BE-I}$ and $V_{BE-II}$ of a transistor, respectively.
FIG. 13 is a schematic circuit diagram of a modified embodiment of FIG. 11.

In another case, a base-emitter voltage $V_{BE}$ generally differs when it is differently connected as shown in FIGS. 12(a) and 12(b). Namely, $V_{BE-I} \neq V_{BE-II}$ in this case. The base-emitter voltages $V_{BE}$ of transistors differ from one another depending upon production lot or a critical difference of manufacturing conditions. Since the operation of this temperature detecting apparatus is based on detection of the difference in collector current as described above, variation of collector current due to difference of base-emitter voltage may cause variation in the difference of collector current even when the collector current $I_1$ (or $I_2$) is adjusted identical for each apparatus. This may give rise to variation of temperature detecting characteristics among products.

Still referring to FIG. 11, assuming that the two transistors $Tr_1$ and $Tr_2$ are at the same temperature and values of the two resistors $R_{10}$ and $R_{11}$ are equal, when a base-emitter voltage $V_{BE-II}$ of the transistor $Tr_2$ is identical to a base-emitter voltage $V_{BE-I}$ of the transistor $Tr_1$, the collector currents $I_2$ and $I_1$ of the transistors $Tr_2$ and $Tr_1$ must be equal because $V_{BE-I}$ is theoretically identical with $V_{BE-II}$. Consequently, when transistors having identical values of $V_{BE-II}$ are selected and the current $I_1$ of every apparatus is adjusted to be identical, the sensitivity of each apparatus can be uniform. However, as a matter of fact, $V_{BE-II}$ is in generaly nearly equal to or larger than $V_{BE-I}$ ($V_{BE-II} \gtrsim V_{BE-I}$), and the ratio of $V_{BE-I}$ to $V_{BE-II}$ ($V_{BE-I}/V_{BE-II}$) of a transistor will vary production lot by production lot accordingly. Hence, even though two transistors having identical base-emitter voltages are used for the transistors $Tr_1$ and $Tr_2$, the collector current $I_2$ will not always be equal to the collector current $I_1$ but will be $I_2 \lesssim I_1$. Therefore, even if the collector current $I_2$ is adjusted to be identical for each apparatus, sensitivity or detecting characteristics will vary from one to another apparatus. It is also very difficult to find a transistor having same value of $V_{BE-I}$ as $V_{BE-II}$ of another one simply because $V_{BE-II}$ of a transistor is generally larger than $V_{BE-I}$ thereof. What has been stated above is generally applicable too in the case of semi-conductor diode.

Referring now to FIG. 13, there is shown a circuit arrangement of another embodiment of temperature detecting apparatus according to this invention, in which $R_{15}$, $R_{15}'$ and $Tr_3$ denote resistors and sensing transistor respectively, and the same denotations, namely, numerals and symbols as shown in FIG. 11, indicate identical or corresponding elements or devices. In this circuit configuration, the transistors $Tr_1$ and $Tr_3$ must have $V_{BE-I}$ equal to each other. When those transistors are selected, it may be easier to pick out two transistors having identical $V_{BE-II}$, because $V_{BE-II}$ can be easily measured and further transistors having identical $V_{BE-II}$ should be of same $V_{BE-I}$ if they are picked up from the same production lot.

A feature of this embodiment resides in a specific way of evolving the temperature difference between the transistors $Tr_1$ and $Tr_3$, in which respective temperature differences between the transistors $Tr_1$ and $Tr_2$ as well as $Tr_2$ and $Tr_3$ are detected in a first process, and then both the differences are compared so as to obtain the temperature difference between the transistors $Tr_1$ and $Tr_3$ in the second process. Employment of such a differential function makes it possible to avoid malfunction due to the difference between $V_{BE-II}$ of the transistor $Tr_2$ and $V_{BE-I}$ of both the transistors $Tr_1$ and $Tr_3$. In the case of utilizing a diode instead of the transistor $Tr_2$ in the circuit described above, the anode (or cathode) electrode is connected to base electrode of the transistors $Tr_1$ and $Tr_3$ respectively while cathode (or anode) electrode thereof is connected to one end of the resistor $R_{10}$.

In operation, it will be hereinafter assumed that ambient temperature around both the transistors $Tr_1$ and $Tr_3$ is uniform, and values of the three resistors $R_{10}$, $R_{11}$ and $R_{15}$ are equal. The difference between the currents $I_2$ and $I_1$, namely $(I_1-I_2)$ will be in proportion to the difference between the temperature of the transistors $Tr_1$ and $Tr_2$, and similarly the difference between the currents $I_3$ and $I_2$, namely $(I_3-I_2)$ will have a value that is in proportion to the temperature difference in the transistors $Tr_2$ and $Tr_3$. As a consequence, the currents $I_1$ and $I_3$ will be the same value. Now further assuming that thermal time constant of the transistors $Tr_1$ and $Tr_2$ are identical and that of the transistor $Tr_3$ is chosen to be different from those of the transistors $Tr_1$ and $Tr_2$, the value of the current $I_1$ will inevitably differ from that of the current $I_3$ until all the transistors $Tr_1$, $Tr_2$ and $Tr_3$ become thermally saturated. This will produce a voltage difference between Vb across the resistor $R_8'$ and Vc across the resistor $R_{15}'$, which is compared in the comparator 2. When the voltage difference reaches a certain predetermined level, the output of the comparator 2 will render the switching transistor Ts "ON", which in turn causes the alarm means 3 to operate.

When the temperature detecting apparatus of this invention is utilized as a fire detector, both the transistors $Tr_1$ and $Tr_2$ should be secured to a same heat sink within the apparatus and at the same time the transistor $Tr_3$ should be mounted on the outer surface of the housing thereof so that thermal time constant of the transistors $Tr_1$ and $Tr_2$ is considerably larger than that of the transistor $Tr_3$. Hence, the temperature difference can be detected. According to this arrangement, while both the transistors $Tr_1$ and $Tr_2$ will follow quite slowly up the change of ambient temperature, the transistor $Tr_3$ can be affected immediately by the ambient temperature change so that quick rise of ambient temperature can readily detected.

In the foregoing, a description has been given of the arrangement and manner whereby the temperature detecting apparatus of this invention is operated by a higher rate of temperature rise. Since it is quite easy to pick transistors having same value of $V_{VE-I}$, uniform sensitivity for every apparatus can easily be provided only by adjusting the current $I_1$ to be identical for each apparatus. It may also be readily understood that this temperature detecting apparatus is not affected by the voltage fluctuation of power supply because the currents $I_1$ and $I_3$ vary in the similar manner that influence thereof can be compensated by the differential function of the apparatus.

It will also be readily understood that, in FIGS. 4 and 11, the transistor $Tr_2$ having larger thermal time constant is used as a reference transistor while the transistor $Tr_1$ having smaller thermal time constant is provided for a sensing transistor in those embodiments. However, the role of those two transistors can be reversed with respect to the thermal time constant, in which the transistor $Tr_1$ works as the reference and the transistor $Tr_2$ senses temperature change. In this case, the transistor $Tr_2$ operates to decrease the collector current $I_1$ when the temperature thereof rises.

Figure 14A:
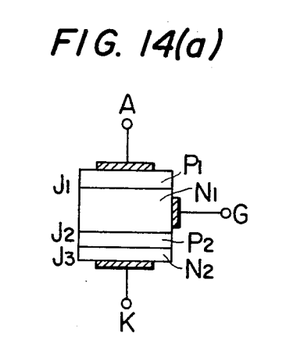
FIG. 14(a) is an illustration of the configuration of a thyristor device.
Figure 14B:
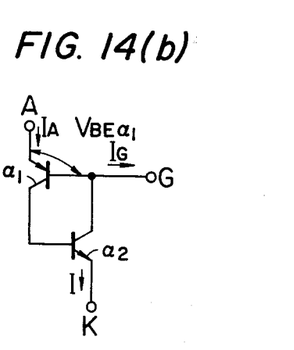
FIG. 14(b) is a schematic diagram of an equivalent circuit of the thyristor device shown in FIG. 13(a)

The relationship between the sensing circuit 1 and comparator circuit 5 will hereinafter be described. Referring again to FIG. 4, an N gate thyristor $SCR_2$ is used as a voltage difference sensing element in the comparator circuit 5. This is of great significance. FIGS. 14(a) and 14(b) show a basic configuration of an N gate thyristor and its equivalent circuit. A thyristor is a type of semi-conductor device having a PNPN structure which is divided into two types, that is, an N gate type having a gate electrode at the middle N layer and P gate type having a gate electrode at the middle P layer. In FIG. 14(a), there is shown an N gate type thyristor, and this type of thyristor is generally considered to be equivalent to a pair of a PNP transistor and an NPN transistor whose base electrodes and collector electrodes are coupled to each other as shown in FIG. 14(b).

To keep the gate (G) and anode (A) of the thyristor at an equal potential so that no gate current flows, and then applying a positive voltage to the anode (A) and at the same time a negative voltage to the cathode (K), the thyristor will be rendered OFF by being reverse-biased between the $N_1$ layer and $P_2$ layer thereof. Then, by decreasing the gate potential gradually, gate current starts to flow across the PN junction of the $P_1$ and $N_1$ layers. When this gate current exceeds a certain value, the thyristor is switched ON. The voltage $V_{AG}$ developed between the anode A and gate G at this moment is the base-emitter voltage $V_{BE\alpha 1}$ of the transistor $\alpha_1$ shown in FIG. 14(B).

As stated in the previous description, the voltage drop of a PN junction under a certain constant current varies linearly as shown in FIG. 1, and its temperature coefficient is negative. This means that the anode-gate voltage (gate-cathode voltage in the case of a P gate type thyristor) required to obtain the gate current $I_G$ that can render the thyristor ON shows the similar variation with respect to temperature as illustrated in FIG. 1.

Both the temperature characteristic of the anode-gate voltage $V_{AG}$ and the output of the sensing circuit 1 shown in FIG. 4 or FIG. 11, namely the increment $\Delta I_1$ of the collector current $I_1$ of the transistor $Tr_1$ exhibit a similar tendency of decreasing when temperature rises according to the temperature dependency of the coefficient A. Accordingly, detecting errors of the sensing circuit due to temperature change can be reduced by associating the temperature characteristic of the sensing transistor on the thyristor. Besides the thyristor, another possible sensing device having a PN junction is a transistor. A semi-conductor diode associated with a comparator circuit can also be used for the same purpose.

In the foregoing description, the temperature detecting apparatus of this invention has been illustrated from the view point of detecting rapid temperature rise. However, another problem is encountered in the case of fire detector or the like, that is, when the ambient temperature reaches a predetermined level even if the temperature rise is quite gradual, a warning signal must be given. Two kinds of satisfactory solutions for such a requirement will now be described.

Figure 15:
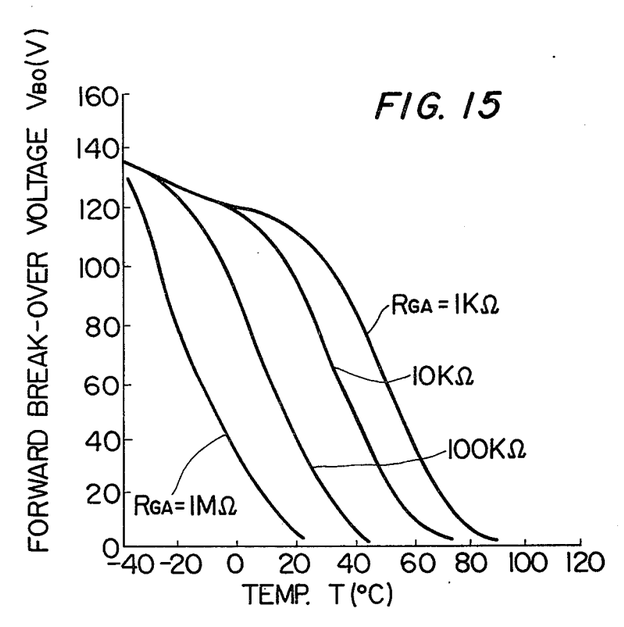
FIG. 15 is a graphical illustration of temperature-forward break-over voltage characteristics of a thyristor device.

The first is to employ a so called thermo-sensitive thyristor in the switching circuit 6 as well as the comparator circuit 5. A thermo-sensitive thyristor is a type of semi-conductor device having a PNPN configuration just like a usual thyristor and its break-over voltage varies in accordance with temperature. A thermo-sensitive thyristor is switched on when the anode-cathode voltage exceeds the break-over voltage. A sample of such characteristics is illustrated in FIG. 15.

There are two kinds of these thyristors, namely, N gate type and P gate type with no difference in their basic performance and the switching temperature can be controlled by connecting an appropriate resistor between anode and gate in the case of N type and between gate and cathode in the case of P type. Taking a thyristor having characteristics shown in FIG. 15, for example, assuming that gate resistor $R_{GA}$ is 1 kilo ohm and supply voltage is 20 volts, the break-over voltage of the thyristor will become less than the supply voltage at 70° C. This means that this thermo-sensitive thyristor will be switched on at 70° C. under those conditions.

On the other hand, since a thermo-sensitive thyristor is quite similar to a usual thyristor in its basic structure, it can be considered as a usual thyristor below the switching temperature. Hence, let a thermo-sensitive thyristor with its switching temperature set at a certain point be used in the place of $SCR_2$ and/or $SCR_3$ of the comparator circuit 5 and switching circuit 6. The temperature detecting apparatus will then not only operate to detect rapid temperature rise until the temperature reaches the predetermined level but also operate to switch the thermo-sensitive thyristor by itself when the temperature thereof reaches the switching temperature even though the temperature rise is gradual. Hence, the temperature detecting apparatus performs its full function to give necessary warnings under either sudden or gradual temperatures changes reaching the threshold level.

The second solution that can meet the requirement without employing thermo-sensitive thyristors is by changing the operative conditions of the sensing circuit.

Considering again the equation (1), and assuming that the collector current $I_1$ of the transistor $Tr_1$ is not equal to that of the transistor $Tr_2$ ($I_1 \neq I_2$), the equation (1) can be understood to express that when two transistors $Tr_1$ and $Tr_2$ having identical characteristics are placed under same circumstances and the ratio of their collector current ($I_2/I_1$) is kept constant, the difference between their respective base-emitter voltages $V_{BE1}$ and $V_{BE2}$ is in proportion to the absolute temperature. The condition $I_1 \neq I_2$ can be satisfied by selecting the resistor $R_{10}$ to be different from the resistor $R_{11}$ ($R_{10} \neq R_{11}$) in the sensing circuit shown in FIG. 4 or FIG. 11. Assuming further that the resistor $R_{10}$ is much greater than the resistor $R_{11}$ ($R_{10} >> R_{11}$), collector current $I_1$ of the transistor $Tr_1$ will be much less than the collector current $I_2$ of the transistor $Tr_2$. Since the natural log of the ratio ($I_2/I_1$) is constant from the previous assumption, namely, $\ln(I_2/I_1) = constant = C'$, the following equation can be derived from the equation (4):

$$I_1 = \frac{kT}{R_{10}q} \ln\left(\frac{I_2}{I_1}\right) + I_{10}\frac{R_{11}}{R_{10}} = \frac{kC'}{R_{10}q}T + I_2\frac{R_{11}}{R_{10}} \quad (9)$$

Equation (9) indicates that the collector current $I_1$ of the transistor $Tr_1$ has the relation of the first degree with the temperature T and consequently changes linearly against the temperature T. The relation in which the collector current $I_1$ varies in accordance with the temperature change can be realized by satisfying the condition not only of $I_1 << I_2$ but also $I_1 < I_2$. In the latter case, the relation will be more or less complicated. If the collector current $I_1$ of the transistor $Tr_1$ is set larger than the collector current $I_2$ of the transistor $Tr_2$, the relation will be reversed, that is, the collector current $I_1$ decreases as the temperature rises.

In view of the foregoing discussion, it will readily be understood that in the sensing circuit 1 shown in FIG. 4 and FIG. 11, assuming that the transistor $Tr_1$ having smaller thermal time constant and the transistor $Tr_2$ having larger one are used as a sensing transistor and a reference one respectively, and the resistors $R_{10}$ and $R_{11}$ are selected to be $R_{10} > R_{11}$ so that the collector current $I_1$ becomes larger than $I_2$, and further the resistors $R_7$ and $R_8$ are set so that when the temperature of those two transistors $Tr_1$ and $Tr_2$ are equal at the usual ambient temperature the voltage $V_1$ developed across the resistor $R_7$ becomes identical with the voltage $V_2$ developed across the resistor $R_8$. A predetermined difference caused between the two voltages $V_1$ and $V_2$ ($V_1 > V_2$ in this instance) is detected by the comparator circuit 5 which in turn drives the switching 6 to give necessary warnings both in the case when a certain temperature difference arises between those two transistors $Tr_1$ and $Tr_2$ due to rapid temperatures rise of the sensing circuit 1 or when the temperatures of those transistors rise gradually to a higher level to be considered unusual.

It will also be recognized that the same purpose can be attained in the manner in which the role of those two transistors is reversed with respect to thermal time constant. That is, a transistor $Tr_1$ having larger thermal time constant is used as reference transistor while a transistor $Tr_2$ having smaller thermal time constant is utilized as sensing transistor. Furthermore, the resistor $R_{10}$ is selected to be smaller than $R_{11}$ with the result that the collector current $I_1$ is set to be larger than $I_2$. In this case, the collector current $I_1$ will decrease when the temperature of the transistor $Tr_1$ rises rapidly or the temperature of those two transistors simultaneously reaches an unusual temperature.

In view of the foregoing description, it will be readily recognized that since the temperature detecting apparatus in accordance with the present invention is based on physical operating characteristics of semi-conductor devices, higher reliability can be assured and there is less variation of products. Although variation of products of among the apparatus of this invention depends upon the variation of the transistors $Tr_1$ and $Tr_2$ of the sensing circuit, and elements such as FET's used in the constant current circuit if it is provided, this can be compensated by checking and arranging the characteristics thereof in the process of selecting parts. Hence, no adjustment is needed in the assembling process. Furthermore, this temperature detecting apparatus is less costly due to its simple construction, which can satisfactorily meet practical requirements.

Figure 16:
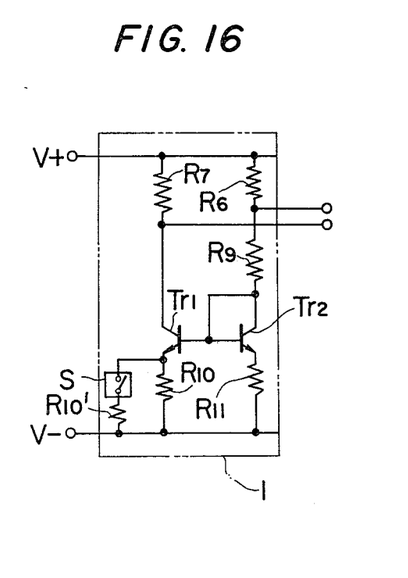
FIG. 16 is a schematic circuit diagram of another embodiment of the present invention.

Another advantage of the temperature detecting apparatus of this invention resides in the ease of carrying out operation tests, which can be made by means of simulating unusual temperature rise by adjusting the collector current of the transistors of the sensing circuit. For attaining this purpose, the most effective way is to change the ratio of the two resistors $R_{10}$ and $R_{11}$ that are connected between the respective emitter of the transistors $Tr_1$ and $Tr_2$ and the power supply. One possible way to change the ratio of those two resistors is illustrated in FIG. 16 in which a series connection of a resistor $R_{10}'$ and a switch S is provided in parallel with the resistor $R_{10}$. Operational tests can be carried out by closing manually or remotely the switch S to simulate the temperature rise without raising the ambient temperature itself. The switch S may be any type of switching device, such as for instance, a mechanical switch of semi-conductor device.

Such a method of operational testing can be performed more easily and safely when compared with the conventional method of heating directly the sensing circuit portion. Since the direct heating method could not be used in a location where an explosive gas or the like exists, this novel method of the present invention is particularly desirable in such a case.

While particular embodiments of the present invention have been shown with a view mostly to illustrate an apparatus for detecting unusual temperature rise, it will be understood, of course, that the invention is not limited thereto since many modifications will occur to those skilled in the art and it is, therefore, contemplated by the appended claims to cover any such modification as fall within the true spirit and scope of the invention.

Since the essential idea of this invention resides in detection of temperature difference, two sensing transistors having identical thermal time constant can detect the temperature difference between two separate points if those transistors are placed thereto. When this invention is associated with a switching function, it will be applicable to an apparatus to keep the temperature difference between two specific points constant, that is, for instance the controller for air conditioning system which maintains the room and out-door temperature in predetermined relation. Further, this invention can also be applied to an overheat proof system for electrical appliances.

What is claimed is:

1. A temperature detecting apparatus, comprising: a first transistor having an emitter, base and collector and having a thermal time constant with respect to ambient temperature;
   a first current path including the emitter-collector path of said first transistor;
   a semi-conductor element having an anode and a cathode and a rectifying PN junction therebetween, said semi-conductor element having a thermal time constant with respect to ambient temperature which is different from the thermal time constant of said first transistor;
   a second current path including said anode and cathode of said semi-conductor element, one of said anode and cathode terminals being coupled to said first transistor base; and
   detection means responsive to current variations in said first or second current paths for detecting a rate of ambient temperature change which exceeds a predetermined value.

2. The apparatus of claim 1, wherein said semi-conductor element is a second transistor having an emitter, base and collector and connected in a diode configuration.

3. The apparatus of claim 1, wherein the anode of said semi-conductor element connected in diode configuration is coupled to the base of said first transistor.

4. The apparatus of claim 1, wherein the cathode of said semi-conductor element connected in diode configuration is coupled to the base of said first transistor.

5. The apparatus of claims 1 or 2 wherein said second current path further comprises a constant current circuit connected in series with said semi-conductor element.

6. The apparatus of claim 1, wherein said first current path further comprises a first resistor connected between a power supply terminal and said emitter of said first transistor and said second current path further comprises a second resistor connected between said power supply terminal and said semi-conductor element, the values of said first resistor and said second resistor being approximately identical to each other.

7. The apparatus of claim 6, wherein the product of the value of said first or second resistor and the forward current of said semi-conductor element exceeds 0.06 ($\Omega \cdot A$).

8. The apparatus of claim 6, wherein the product of the value of said first or second resistor and the collector current of said first transistor exceeds 0.06 ($\Omega \cdot A$).

9. The apparatus of claim 6, wherein said second resistor is coupled between the anode of said semi-conductor and said power supply.

10. The apparatus of claim 6, wherein said second resistor is coupled between a cathode of said semi-conductor and said power supply.

11. The apparatus of claim 2 wherein said first current path further comprises a first resistor connected between a power supply and the emitter of said first transistor, and said second current path further comprises a second resistor connected between the power supply and the emitter of said second transistor, the values of said first resistor and said second resistor being approximately identical to each other.

12. The apparatus of claim 11, wherein the product of the value of said first or second resistor and the collector current of said first transistor exceeds 0.06 ($\Omega \cdot A$).

13. The apparatus of claims 6 or 11, further comprising a comparator circuit including a switching device having PN junction, said comparator circuit being arranged to produce an output when the difference between the currents of said first and second current paths.

14. The apparatus of claim 13 further comprising means for changing the value of said first resistor or said second resistor to vary the collector current of said transistor.

15. The apparatus of claims 6, 7, 8, 9, 10, 11 or 12, further comprising means for changing the value of said first resistor or said second resistor to vary the collector current of said second transistor.

16. A temperature detecting apparatus, comprising:
   a first transistor having an emitter, base and collector and having a first thermal time constant with respect to ambient temperature;
   a first current path including the emitter-collector path of said first transistor;
   a semi-conductor element coupled in diode configuration and having an anode and a cathode and a rectifying PN junction therebetween, said semi-conductor element having a second thermal time constant with respect to ambient temperature which differs from said first thermal time constant;
   a second current path including the anode and cathode of said semi-conductor element, one of said anode and cathode being coupled to said first transistor base;
   a second transistor having an emitter, base and collector and having a third thermal time constant with respect to ambient temperature which is substantially the same as said second thermal time constant, the base of said second transistor being coupled to the base of said first transistor;
   a third current path including the emitter-collector path of said second transistor; and
   means for comparing the currents through said first and third current paths to detect a rate of ambient temperature increase which exceeds a predetermined value.

17. The apparatus of claim 16, wherein said semi-conductor element comprises a third transistor having its base coupled to the bases of said first and second transistors.

18. The apparatus of claim 1, wherein said first current path further comprises a first resistor connected between a power supply terminal and the emitter of said first transistor, and said second current path further comprises a second resistor connected between said power supply terminal and said semi-conductor element, the value of said first resistor being greater than the value of said second resistor whereby the current through said first current path is substantially proportional to absolute temperature.

19. The temperature detecting apparatus of either claim 1 or 16, wherein said detection means provides an output signal in response to an excessive current difference between said first and second current paths, said apparatus further comprising means responsive either to said output signal or to an excessive absolute temperature for indicating an excessive temperature condition.

20. The temperature detecting apparatus of claim 1, wherein said detection means compares currents through said first and second current paths.

* * * * *